US009152513B2

(12) United States Patent
Saxena et al.

(10) Patent No.: US 9,152,513 B2
(45) Date of Patent: Oct. 6, 2015

(54) IN-BAND RECOVERY MECHANISM FOR I/O MODULES IN A DATA STORAGE SYSTEM

(71) Applicant: NetApp, Inc., Sunnyvale, CA (US)

(72) Inventors: Mayank Saxena, Fremont, CA (US); Melvin McGee, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 107 days.

(21) Appl. No.: 14/160,264

(22) Filed: Jan. 21, 2014

(65) Prior Publication Data

US 2015/0205685 A1 Jul. 23, 2015

(51) Int. Cl.
G06F 11/00 (2006.01)
G06F 11/20 (2006.01)
H04L 12/707 (2013.01)
G06F 13/42 (2006.01)

(52) U.S. Cl.
CPC ............ *G06F 11/201* (2013.01); *G06F 13/426* (2013.01); *H04L 45/22* (2013.01)

(58) Field of Classification Search
CPC ... G06F 3/0635; G06F 3/0064; G06F 3/0683; G06F 3/0619; G06F 3/0617; H04L 49/25; H04L 49/351; H04L 49/557; H04L 49/201
See application file for complete search history.

(56) References Cited

U.S. PATENT DOCUMENTS

| | | | |
|---|---|---|---|
| 8,099,624 B1* | 1/2012 | Saxena et al. | 714/5.11 |
| 8,392,751 B2* | 3/2013 | Khatri et al. | 714/5.1 |
| 8,954,784 B2* | 2/2015 | Bower et al. | 714/4.11 |
| 2002/0087751 A1* | 7/2002 | Chong, Jr. | 710/33 |
| 2003/0233603 A1* | 12/2003 | Nagata | 714/48 |
| 2006/0107004 A1* | 5/2006 | Benhase et al. | 711/162 |

FOREIGN PATENT DOCUMENTS

WO 2006055191 A2 5/2006

OTHER PUBLICATIONS

International Search Report and Written Opinion Mar. 30, 2015 of PCT Application No. PCT/US2015/012197, filed Jan. 21, 2015 (11 pages).

* cited by examiner

*Primary Examiner* — Nadeem Iqbal
(74) *Attorney, Agent, or Firm* — LeClairRyan, a Professional Corporation

(57) ABSTRACT

Technology is disclosed for recovering I/O modules in a storage system using in-band alternate control path (ACP) architecture ("the technology"). The technology enables a storage server to transmit control commands, e.g., for recovering an I/O module, to the I/O module over a data path that is typically used to transmit data commands. The control commands are typically transmitted using ACP that is separate from the data path. By enabling transmission of control commands over the data path, the technology eliminates the need for separate medium for ACP, at least in part, to transmit the control commands. The technology can be implemented in a pure in-band ACP mode, which supports recovering an I/O module of a storage shelf in which at least one I/O module is responsive, and/or in a mixed in-band ACP mode, which supports recovery of I/O modules of a storage shelf in which all I/O modules are non-responsive.

30 Claims, 11 Drawing Sheets

IN-BAND RECOVERY MECHANISM FOR I/O MODULES IN A DATA STORAGE SYSTEM

TECHNICAL FIELD

Several of the disclosed embodiments relate to recovering an I/O module in a storage system, and more particularly, to recovering an I/O module using a data path, which is used to transmit data access commands, to transmit alternate control path control commands.

BACKGROUND

A storage server operates on behalf of one or more clients to store and manage shared files. A client can send a request to the storage server to access data stored on disks in a storage subsystem. The storage server includes a storage adapter coupled to an I/O module in the storage subsystem that creates a data path to access the data stored on the disks. An I/O module can receive and process a request. An I/O module, however, may be non-responsive to a request which can result in a time-out. The data storage systems include a means, e.g., alternate control path (ACP) separate from the data path for controlling a non-responsive I/O module. The ACP connects the storage server to the I/O modules and also connects each of the I/O modules to each other within the storage subsystem.

However, such an ACP can result in an increased number of ACP connection cables. The problem can be significant, especially in datacenters where a number of storage servers are installed. Greater the number of storage servers, disks, and/or I/O modules, greater is the number of ACP cables. Further, this can also result in increased costs due to, for example, the ACP cables, configuring the storage system to be compatible with the ACP, manufacturing costs—adding ACP ports to the devices, effort involved in testing and validating the function of ACP, etc.

DETAILED DESCRIPTION

Figure 1:
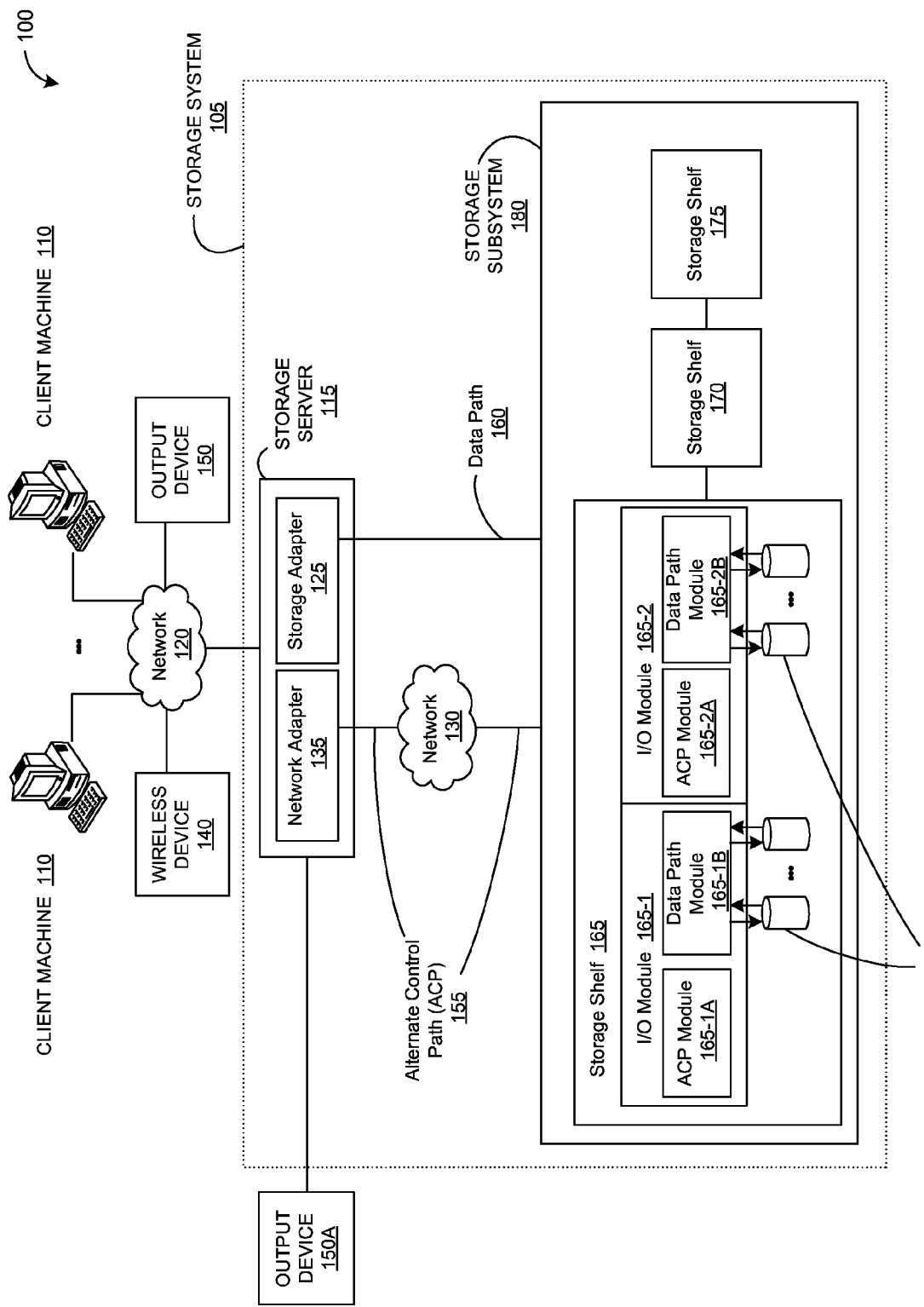
FIG. 1 is a block diagram illustrating an environment in which a control architecture for controlling input-output (I/O) modules in a storage system can be implemented.

Technology is disclosed for controlling input-output (I/O) modules in a storage system using an in-band alternate control path architecture ("the technology"). Various embodiments of the technology provide an in-band alternate control path architecture (hereinafter referred to as "control architecture") that enables a storage server to transmit control commands, e.g., for recovering an I/O module, to an I/O module in the storage system over a data path. The data path between the storage server and the I/O module is typically used to transmit data access commands. The control commands are typically transmitted to the I/O module using an alternate control path (ACP), e.g., created using Ethernet, between the storage server and the I/O module. In some embodiments, ACP is a protocol that enables a storage server to manage and control the storage subsystem. It uses a separate network (alternate path) from the data path, so management communication is not dependent on the data path's being intact and available. However, the control architecture enables the storage server to send the control commands over the data path. By enabling the storage server to transmit the control commands over the data path, embodiments of the technology can eliminate the need for using an ACP, at least in part, to transmit the control commands. This can also eliminate or minimize the number of cables, e.g., Ethernet cables used to create the ACP. The control architecture can be implemented in various modes of operation of the storage system, e.g., pure in-band ACP control mode and mixed in-band ACP control mode.

In some embodiments, pure in-band ACP mode supports recovering an I/O module in a storage shelf when at least one of the I/O modules in the storage shelf is responsive. In pure in-band ACP control mode, the ACP between the storage server and the storage system, and between the I/O modules in the storage system is not connected. In some embodiments, this can mean that there are no Ethernet cables connecting the ACP between (a) the storage server and the storage system, and (b) the I/O modules within the storage system.

In the pure in-band ACP control mode, to recover a particular non-responsive I/O module, a control command, e.g., reset command, is proxied into the particular I/O module from a partner I/O module of the particular I/O module. More specifically, a storage server generates an in-band control command containing the control command and transmits the in-band control command to the partner I/O module over the data path. The partner I/O module extracts the control command from the in-band control command and causes the control command to be executed by the particular non-responsive I/O module, e.g., causes the particular I/O module to reset or reboot. In some embodiments, the partner I/O module is another I/O module in the same storage shelf as the particular I/O module.

In some embodiments, mixed in-band ACP control mode supports recovering one or more I/O modules in a situation where all of the I/O modules in a storage shelf are non-responsive, e.g., wedged. In mixed in-band ACP control mode, while the ACP between the storage server and the storage system is not connected, the ACP between the I/O modules within the storage system can be connected. In some embodiments, this can mean that while there are Ethernet cables connecting the ACP between the I/O modules within the storage system, there are no Ethernet cables connecting the ACP between the storage server and the storage system.

In the mixed in-band ACP control mode, to recover I/O modules of the storage shelf which are non-responsive, a control command, e.g., reset command, is proxied into one of the non-responsive I/O modules from an I/O module of another storage shelf. More specifically, a storage server generates an in-band control command containing the control command and transmits the in-band control command to an I/O module of another storage shelf over the data path. The I/O module extracts the control command from the in-band control command, transmits the control command to the one of the non-responsive I/O modules over the ACP connecting the non-responsive I/O module, and causes the control command to be executed by the one of the non-responsive I/O modules. After one of the I/O modules has recovered, the other non-responsive I/O modules in the storage shelf can be recovered either in mixed in-band ACP control mode or pure in-band ACP control mode.

Environment

FIG. 1 is a block diagram illustrating an environment 100 in which the control architecture for controlling I/O modules in a storage system can be implemented. A storage server 115 sends client requests to a storage subsystem 180 for accessing data stored on storage devices 160 in the storage subsystem 180. An I/O module, e.g., I/O module 165-1, in the storage subsystem 180 can receive and process data commands for accessing the data. An I/O module, however, may be non-responsive to the request, which can result in a time-out. The control architecture provides the ability to automatically change the behavior of a non-responsive I/O module to recover the non-responsive I/O module (e.g., by resetting or power cycling the non-responsive I/O module) through a data path 160.

The storage server 115 can be a file server or "filer," using which the control architecture can be implemented. In some embodiments, the storage server 115 is a storage server product of NetApp, Inc., Sunnyvale, Calif., that uses the NetApp® Data ONTAP™ storage operating system. However, any appropriate storage server can be enhanced for use in accordance with the control architecture described herein. The storage server 115 is coupled to a storage subsystem 180 which includes an array of mass storage devices 160 (e.g., disks), and to a set of storage client machines 110 (hereinafter simply "clients") through a network 120. The network 120 may be, for example, a local area network (LAN), a wide area network (WAN), a metropolitan area network (MAN), a wireless network, a global area network (GAN) such as the Internet, a Fibre Channel fabric, or the like, or a combination of any such types of networks. The network 120 can include any number of networking and computing devices such as wired and wireless devices 140. Each of the clients 110 can be, for example, a conventional personal computer (PC), server-class computer, workstation, or the like.

In some embodiments, the storage server 115 and the storage subsystem 180 form a modular storage system 105 in which one or more sets of mass storage devices 160, each in a separate chassis ("enclosure"), are connected to the storage server 115 in another chassis via network 130. The network 130 can be, for example, a local area network (LAN), a wide area network (WAN), a metropolitan area network (MAN), a wireless network, Internet, a Fibre Channel fabric, or the like, or a combination of any such types of networks. The mass storage devices 160 in the storage subsystem 180 can be, for example, conventional magnetic disks, optical disks such as CD-ROM or DVD-based storage, magneto-optical (MO) storage, or any other type of non-volatile storage devices suitable for storing large quantities of data. The storage devices 160 can further be organized as a Redundant Array of Inexpensive Disks/Devices (RAID), whereby the storage server 115 accesses the storage devices 160 using RAID protocols.

It will be appreciated that certain embodiments may be implemented with solid-state memories including flash storage devices constituting storage array (e.g., disks 160). For example, a storage server (e.g., storage server 115) may be operative with non-volatile, solid-state NAND flash devices which are block-oriented devices having good (random) read performance, i.e., read operations to flash devices are substantially faster than write operations. Data stored on a flash device is accessed (e.g., via read and write operations) in units of pages, which in the present embodiment are 4 kB in size, although other page sizes (e.g., 2 kB) may also be used.

The enclosures for the storage devices 160 are herein referred to as "shelves," "storage shelf," or "storage shelves." The storage server 115 is coupled to a number of external storage shelves, e.g., storage shelves 165, 170 and 175. Each storage shelf 165, 170 and 175 contains multiple storage devices 160 operated under control of the storage server 115 according to RAID protocols, and includes at least one I/O module, e.g., I/O module 165-1. For example, the storage shelf 165 includes two I/O modules 165-1 and 165-2. The I/O module 165-2 is a partner module to I/O module 165-1 and I/O module 165-1 is a partner module to I/O module 165-2. An I/O module 165-1, 165-2 serves as a communications interface between the storage server 115 and the storage devices 160 in the storage shelf 165. The storage devices 160 in the storage shelf 165 can be connected to the I/O module 165-1 and 165-2 by a standard Fibre Channel connection.

The storage subsystem 180 is managed by the storage server 115. The storage server 115 receives and responds to various read and write requests from the clients 110, that are directed, as data commands, to data stored in, or to be stored in, the mass storage devices 160 in the storage subsystem 180. The storage server 115 includes a storage adapter 125 coupled to the I/O modules 165-1, 165-2 in the storage subsystem 180 creating a data path 160 to access the data stored in, or to be stored in, the mass storage devices 160. The storage adapter 125 is coupled to data path modules of the I/O modules in the storage shelves to create the data path 160. For example, the storage adapter 125 is coupled to data path modules 165-1B and 165-2B on the I/O modules 165-1 and 165-2, respectively to create the data path 160. A data path module, e.g., data path module 165-1B, can include various components, including a data processor (not illustrated). The data can be transmitted over the data path 160 using various data transmission protocols. In some embodiments, the data transmission protocol is a serial attached small computer system interface (SAS) protocol. Accordingly, the data path 160 can be a SAS interface created using SAS cables and the data commands transmitted over the data path 160 can be based on SAS protocol.

The storage server 115 also includes a network adapter 135 that can be coupled to ACP modules on the I/O modules in the storage shelves to create an alternate control path 155 to control the I/O modules. For example, the network adapter 135 can be coupled to ACP modules 165-1A and 165-2A on the I/O modules 165-1 and 165-2, respectively to create the ACP 155.

In some embodiments, ACP 155 is used to transmit control commands to control the I/O modules. The storage server 115 issues a control command via the ACP to the I/O module 165-1 that when executed by the data path module 165-1B of the I/O module 165-1 controls the I/O module 165-1. However, the control architecture consistent with embodiments of the disclosed technology can control the I/O modules without using the ACP 155, at least in part.

The control commands can be of a protocol different from that of data commands. For example, the control commands can be of ACP protocol. The ACP module 165-1A can include various components, including an ACP processor (not illustrated). In some embodiments, the ACP can be used to access status data (not illustrated) of the I/O modules 165-1, 165-2. The storage server 115 outputs I/O module status data to one or more clients 110 and wireless devices 140. The storage server 115 also outputs I/O module status data to an output device 150A,B (e.g., display unit, printer) coupled to the storage server 115. The storage server 115 is locally coupled to an output device 150A or communicates to an output device 150B via network 120.

Although illustrated as a self-contained element, the storage server 115 may have a distributed architecture. For example, the storage server 115 may include a separate N- ("network") module (not shown) and D- ("data") module. Alternatively, the storage server 115 can have an integrated architecture, where the network and data components are all contained in a single box. The storage server 115 can also be coupled through a switching fabric to other similar storage servers (not shown), which have their own local storage subsystems. In this way, all of the storage subsystems 180 can form a single storage pool, to which any client of any of the storage servers has access.

It should also be noted that the control architecture can be applied in other types of storage systems, such as storage servers, which provide clients with either or both block-level access and file-level access to stored data, or processing systems other than storage servers, and network devices configured to provide storage services.

Figure 2:
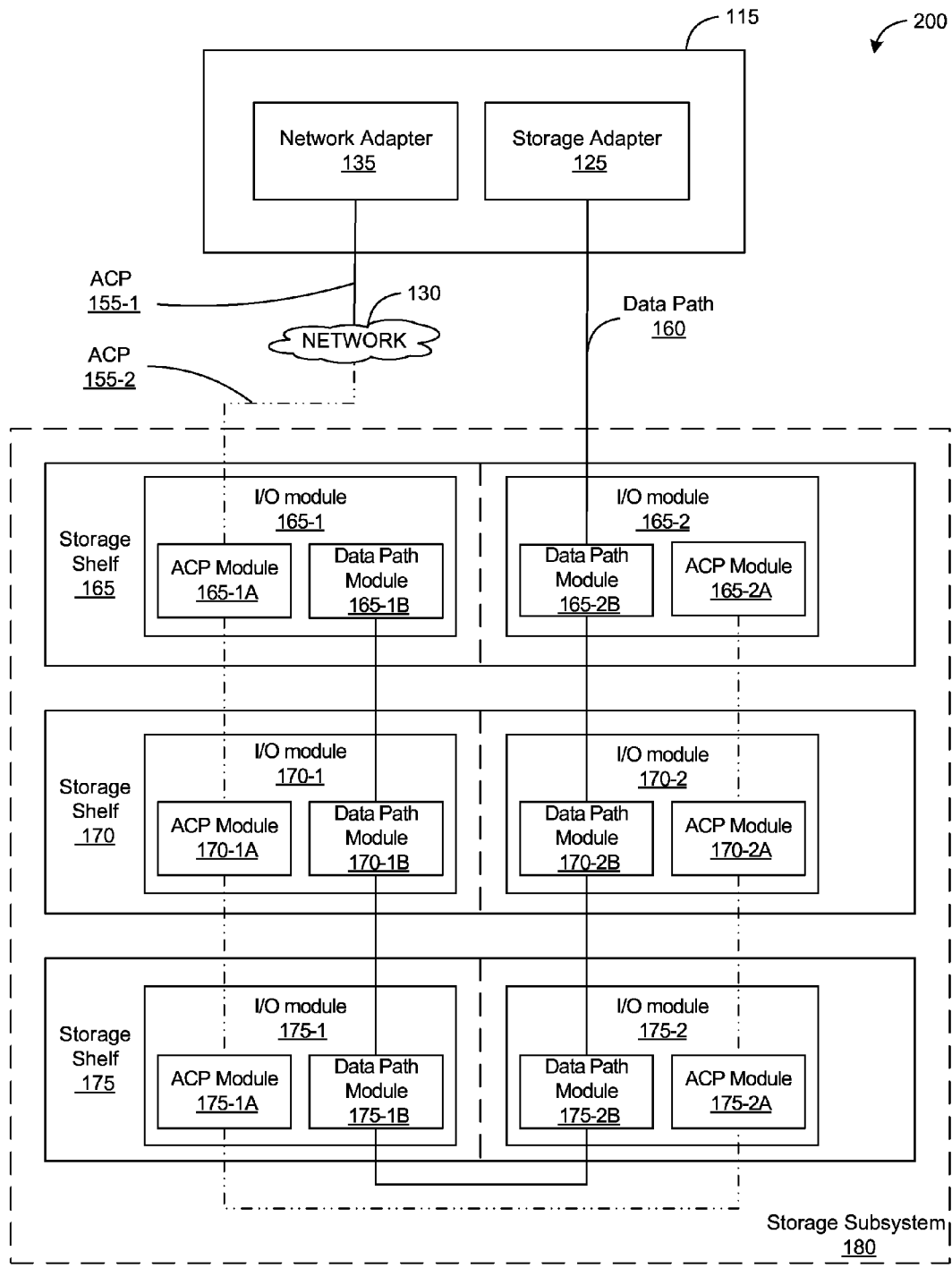
FIG. 2 is a block diagram illustrating a networked storage system having a storage server coupled to a storage subsystem having three external storage shelves, consistent with various embodiments of the disclosed technology.

FIG. 2 is a block diagram illustrating a networked storage system 200 having a storage server coupled to a storage subsystem having three external storage shelves, consistent with various embodiments. In some embodiments, the networked storage system 200 is similar to the storage system 105 of FIG. 1. In the networked storage system 200, each of the storage shelves 165 to 175 has the same construction. In some embodiments, each of the storage shelves 165 to 175 is similar to the storage shelf 165 of FIG. 1. Each storage shelf 165 to 175 includes multiple mass storage devices (e.g., as illustrated in FIG. 1) and an I/O module pair. For example, storage shelf 165 includes an I/O modules 165-1 and 165-2. The storage server 115 is connected to the I/O modules and the I/O modules in each of the shelves is connected with I/O modules of an adjacent storage shelf forming a loop. For example, I/O module 170-1 is connected between storage shelf 165 and storage shelf 175, and I/O module 165-1 is connected between storage shelf 170 and storage server 115.

A person of ordinary skill in the art would appreciate that the networked storage system 200 described herein can be implemented in various configurations. For example, there can be a greater or smaller number of storage shelves 165-175, the number of storage servers 115 can be more, there can be more than one stack of storage shelves connected to the storage server 115, etc.

The storage server 115 includes a storage adapter 125 coupled to, for example, I/O module 165-2 in the storage subsystem 180 creating a data path 160 to access the data stored in the mass storage devices in storage shelf 165. The storage adapter 125 couples to data path module 165-2B on I/O module 165-2 to create the data path 160. For example, the data path 160 can be created using SAS cables. The data path module 165-2B on storage shelf 165 can further be coupled to data path module on another storage shelf, e.g., to data path module 170-2B on storage shelf 170 and so on. The data path 160 can be used to access data from the mass storage devices that are connected to the I/O modules in the storage subsystem 180.

The network adapter 135 on storage server 115 is coupled to ACP module 165-1A on I/O module 165-1 creating an ACP 155, which includes ACP 155-1 and 155-2, to control the I/O module 165-1 and to access status data of the I/O module 165-1. The ACP module 165-1A on I/O module 165-1 can further be coupled to ACP module on another storage shelf, e.g., ACP module 170-1A on I/O module 170-1 and so on. The network cabling (e.g., Ethernet cables) coupling the I/O modules and storage server 115 creates a complete network (e.g., Ethernet network) independent of the data path 160. This independent network creates the ACP 155-1 between the storage subsystem 180 and the storage server 115, and ACP 155-2 between the I/O modules of the storage shelves 165-175 for automatically controlling the I/O modules 165-1 to 175-1 and 165-2 to 175-2.

The I/O modules, e.g., I/O module 170-1, can include various other components in or beside the ACP module and the data path module. For example, the data path module 170-1B of the I/O module 170-1 can include a data Complex Programmable Logic Device (data CPLD), a data processor, and a memory (all of which are not illustrated). The memory can be coupled to the data processor to store data associated with the data processor and data associated with the mass storage devices (e.g., mass storage devices 160) coupled to the data processor. The data CPLD can also include bit map memory for programming the data CPLD.

The ACP module 170-1A can include a switch (not illustrated) coupling the I/O module in the storage subsystem 180 to a network adapter 135 in the storage server 115. In some embodiments, the switch is an Ethernet switch on-board the I/O module. The switch is coupled to the storage server 115 via Ethernet cabling creating the alternate control path 155-1 and 155-2. In other embodiments, the switch uses networking technology other than Ethernet (e.g., fiber channel) to create a network coupling ACP module to the storage server 115 independent of the network coupling data path module to the storage server 115.

The ACP module 170-1A can also include an ACP processor, an ACP CPLD, and a memory (all of which are not illustrated). The ACP processor obtains the control command from the switch and causes a data processor (e.g., in the data path module) to execute the control command for changing the behavior of the I/O module 170-1, such as causing the I/O module 170-1 to reset or power cycle. In some embodiments, the ACP processor causes the data processor to change the behavior (e.g., reset, power cycle) of the I/O module 170-1 through the ACP CPLD and the data CPLD. The ACP CPLD and the data CPLD can contain programmable logic to implement a specific design feature. The ACP CPLD can include a bit map memory for programming the ACP CPLD.

The ACP processor can program the ACP CPLD to program the data CPLD. In some embodiments, the ACP processor programs the ACP CPLD by setting one or more bits in the bit map memory of the ACP CPLD. The ACP CPLD programs the data CPLD to cause the data processor to execute the control command. The ACP CPLD programs the data CPLD by setting one or more bits in the bit map memory of the data CPLD. For example, the control command may be a reset command and the ACP CPLD sets one or more bits in bit map memory programming the data CPLD to cause the data processor to reset the I/O module 170-1. In another example, the control command may be a power cycle command. The ACP CPLD programs the data CPLD to cause the data processor to power cycle the I/O module 170-1.

The ACP module 170-1A can include memory coupled to the ACP processor to store data. For example, the memory stores status data of the I/O module 170-1. The I/O module 170-1 status data includes post-data stored in the memory after the behavior of the I/O module 170-1 has been changed (e.g., the I/O module 170-1 has been reset or power cycled). Examples of I/O module status data include connection data, I/O module firmware version data, I/O module logs, voltage status data, I/O module core dump data, and SAS address data.

Referring back to the ACP 155-1 and 155-2, though this independent network creates the ACP between the storage server 115 and the I/O modules 165-1 to 175-1 and 165-2 to 175-2 for automatically controlling the I/O modules, the control architecture enables the networked storage system 200 to be modified to control the I/O modules with no or minimized ACP. For example, a network storage system 300 of FIG. 3 which supports pure in-band ACP control mode allows the storage server 115 to control the I/O modules without ACP 155-1 and 155-2. In another example, a network storage system 500 of FIG. 5 which supports mixed in-band ACP allows the storage server 115 to control the I/O modules without ACP 155-1. Additional details with respect to the control architecture and the pure and mixed in-band ACP control modes are described in the following paragraphs, and at least with reference to FIGS. 3-9.

Figure 3:
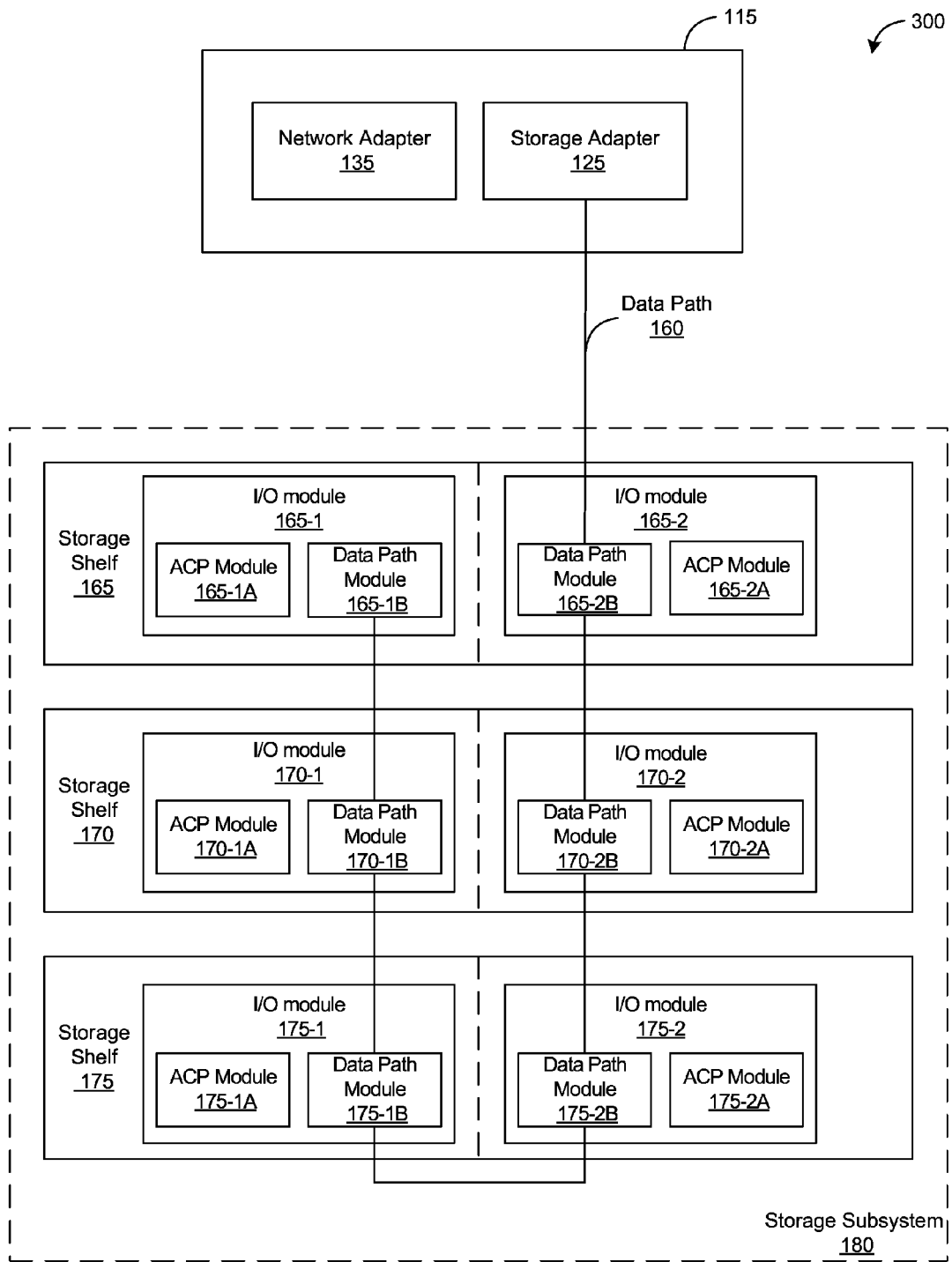
FIG. 3 is a block diagram of a network storage system for controlling I/O modules using a pure in-band alternate control path (ACP) control mode, consistent with various embodiments of the disclosed technology.

FIG. 3 is a block diagram of a network storage system 300 for controlling I/O modules using a pure in-band ACP control mode, consistent with various embodiments of the disclosed technology. In the networked storage system 300, the storage server 115 is connected to the I/O modules via the data path 160. However, the networked storage system 300 does not include an ACP between (a) the storage server 115 and the I/O modules 165-1 to 175-1 and 165-2 to 175-2 and (b) the I/O modules 165-1 to 175-1 and 165-2 to 175-2. That is, the networked storage system 300 does not include ACP 155-1 and 155-2 of the networked storage system 200.

The storage server 115 can control the I/O modules 165-1 to 175-1 and 165-2 to 175-2 by sending the control commands over the data path 160. However, since the control command is of a different protocol from that of the data commands supported by the data path 160, the storage server 115 encapsulates the control command into a protocol supported by the data path 160 and generates an in-band control command that is supported by the data path 160. For example, if the control command is of ACP protocol and a data command supported by the data path 160 is of SAS protocol, the storage server 115 encapsulates the control command into the SAS protocol to generate the in-band control command. The in-band control command is then transmitted over the data path 160 to a particular non-responsive I/O module.

For example, to recover a failed/non-responsive/wedged I/O module 170-2, the storage server 115 proxies an in-band control command containing a control command, e.g., reset command, into the I/O module 170-2 from a partner I/O module 170-1 (Note that I/O modules in the same storage shelf are referred to as partner I/O modules.). The partner I/O module 170-1 extracts the control command from the in-band control command and causes the control command to be executed by the I/O module 170-2, which is described in further detail with reference to FIG. 4, to recover the I/O module 170-2.

By eliminating the ACP 155, the cables required for creating the ACP, e.g., Ethernet cables, are also eliminated, number of hardware connections is minimized, thereby simplifying the configuration of the storage system 300. Since the transport layer, e.g., Ethernet stack is not used anymore, the use of network processor is minimized, the Ethernet related security issues are minimized, all of which can result in minimizing the consumption of the computing resources. Further, the control architecture also supports older storage system installations in which the components, e.g., storage server, storage shelves, etc., do not have ACP ports on them.

Figure 4:
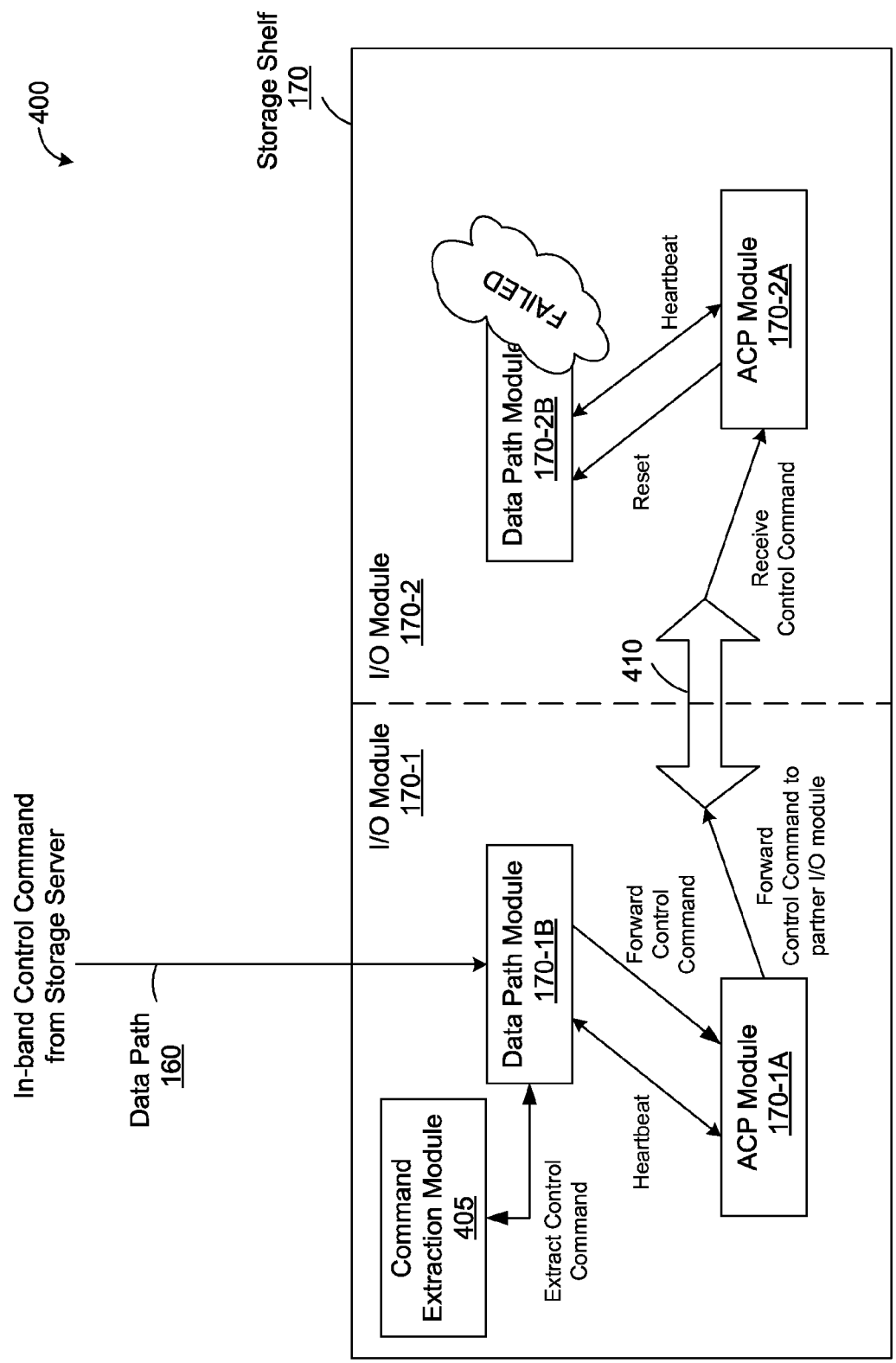
FIG. 4 is a block diagram illustrating a system for controlling I/O modules of the storage subsystem using the pure in-band ACP control mode, consistent with various embodiments of the disclosed technology.

FIG. 4 is a block diagram illustrating a system 400 for controlling I/O modules 170-1 and 170-2 of the storage subsystem 180 using pure in-band ACP control mode, consistent with various embodiments of the disclosed technology. In the system 400, the I/O modules 170-1 and 170-2 are in the same storage shelf 170 of the storage subsystem 180. The I/O modules 170-1 and 170-2 can be referred to as partner I/O modules since they are in the same storage shelf 170. Consider that I/O module 170-2 is non-responsive to data commands from storage server 115, e.g., data path module 170-2B is wedged. The storage server 115 can control/recover the I/O module 170-2 by sending control commands, e.g., for resetting, rebooting, power cycling, etc., to the data path module 170-2B of the I/O module 170-2.

When the storage server 115 detects that the I/O module 170-2 is non-responsive, the storage server 115 generates an in-band control command containing a control command, e.g., a reset command, to reset the failed I/O module 170-2. The in-band control command is generated by encapsulating the control command, which is in a protocol different from that of the compatible with data path, into the protocol compatible with the data path 160. For example, an ACP protocol reset command is encapsulated into SAS protocol to generate the in-band reset command.

The in-band control command is then sent over the data path 160 to a partner I/O module, e.g., I/O module 170-1, of the wedged I/O module 170-2. The in-band control command is sent to the I/O module 170-1 and not directly to wedged I/O module 170-2 since the data path module 170-2B of I/O module 170-2 is wedged and cannot receive the in-band control command directly from data path 160 nor there is an ACP between the wedged I/O module 170-2 and the storage server 115 to receive the command. The I/O module 170-1 receives the in-band control command at the data path module 170-1B. The data path module 170-1B extracts the control command from the in-band control command and forwards it to the ACP module 170-1A.

In some embodiments, the data path module 170-1B receives the in-band control command at the data processor of the data path module 170-1B. In some embodiments, a command extraction module 405 that is associated with the data path module 170-1B extracts the control command from the in-band control command. The command extraction module 405 extracts the control command from the in-band control command by converting the in-band control command from the protocol that is used to transmit through the data path 160 to protocol of the control command. For example, the in-band control command is converted from SAS protocol to ACP protocol. The control command is then forwarded to the ACP module 170-1A by the data path module 170-1A.

The ACP module 170-1A receives the control command and forwards it to the ACP module 170-2A of the wedged I/O module 170-2. In some embodiments, the ACP module 170-1A receives the control command at the ACP processor of the ACP module 170-1A. The ACP module 170-1A forwards the control command over an internal command path 410. In some embodiments, internal command path 410 is a virtual LAN (VLAN). The internal command path 410 enables communication between partner I/O modules in a storage shelf, e.g., I/O module 170-1 and 170-2 in storage shelf 170.

After receiving the control command, the ACP module 170-2A causes the data path module 170-2B to execute the control command, e.g., causes the data processor to be reset. After resetting the data path module 170-2B, the data path module 170-2B can become responsive to the data commands from the storage server 115.

Various techniques may be used to detect or monitor a state of data path module, e.g., whether the data path module is responsive. In some embodiments, a heartbeat mechanism is used to determine whether a data path module is responsive. For example, the data path module 170-2B transmits an heartbeat message to the ACP module 170-2A at regular predefined intervals indicating that it is responsive. If the ACP module 170-2A does not receive a heartbeat message for a predefined period of time, then it may be determined that the data path module 170-2B is not responsive. The storage server 115 may then send an appropriate control command to control the data path module 170-2B.

Figure 5:
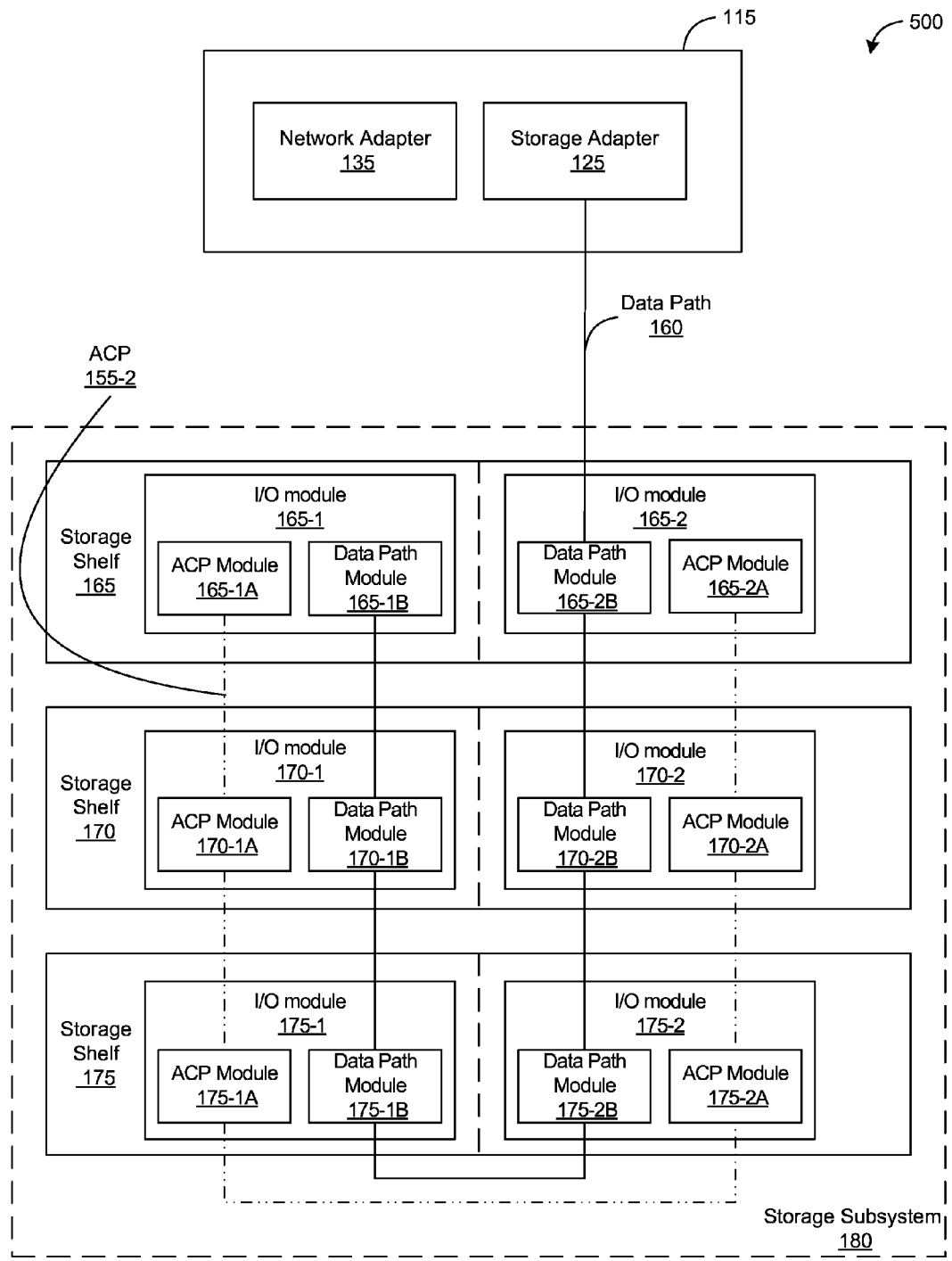
FIG. 5 is a block diagram of a network storage system for controlling I/O modules using a mixed in-band ACP control mode, consistent with various embodiments of the disclosed technology.

FIG. 5 is a block diagram of a network storage system 500 for controlling I/O modules using a mixed in-band ACP control mode, consistent with various embodiments of the disclosed technology. In the networked storage system 500, the storage server 115 is connected to the I/O modules 165-1 to 175-1 and 165-2 to 175-2 via the data path 160. While the I/O modules 165-1 to 175-1 and 165-2 to 175-2 are also connected to each other via an ACP 155-2, the storage server 115 is not connected to the storage subsystem 180 via the ACP.

The storage server 115 can control the I/O modules 165-1 to 175-1 and 165-2 to 175-2 by sending the control commands over the data path 160. As described at least with reference to FIGS. 3 and 4, the storage server 115 generates an in-band control command containing the control command and transmits it over the data path 160 to control a particular non-responsive I/O module. The mixed in-band ACP control mode of the network storage system 500 supports recovering of I/O modules in a scenario where all the I/O modules of a storage shelf have failed.

To recover the non-responsive I/O modules of the storage shelf, a control command is proxied into one of the non-responsive I/O modules from an I/O module of another storage shelf, e.g., an adjacent storage shelf. The storage server 115 sends an in-band control command to a specific I/O module in the adjacent storage shelf over the data path 160. The specific I/O module then extracts the control command from the in-band control command, forwards it to one of the non-responsive I/O modules over the ACP 155-2 which is then executed at one of the non-responsive I/O modules to recover the one of the non-responsive I/O modules. After one of the I/O modules has recovered, the other non-responsive I/O modules in the storage shelf can be recovered either in mixed in-band ACP control mode or pure in-band ACP control mode. An example of recovering I/O modules using mixed in-band control mode is described with reference to FIG. 5.

Figure 6:
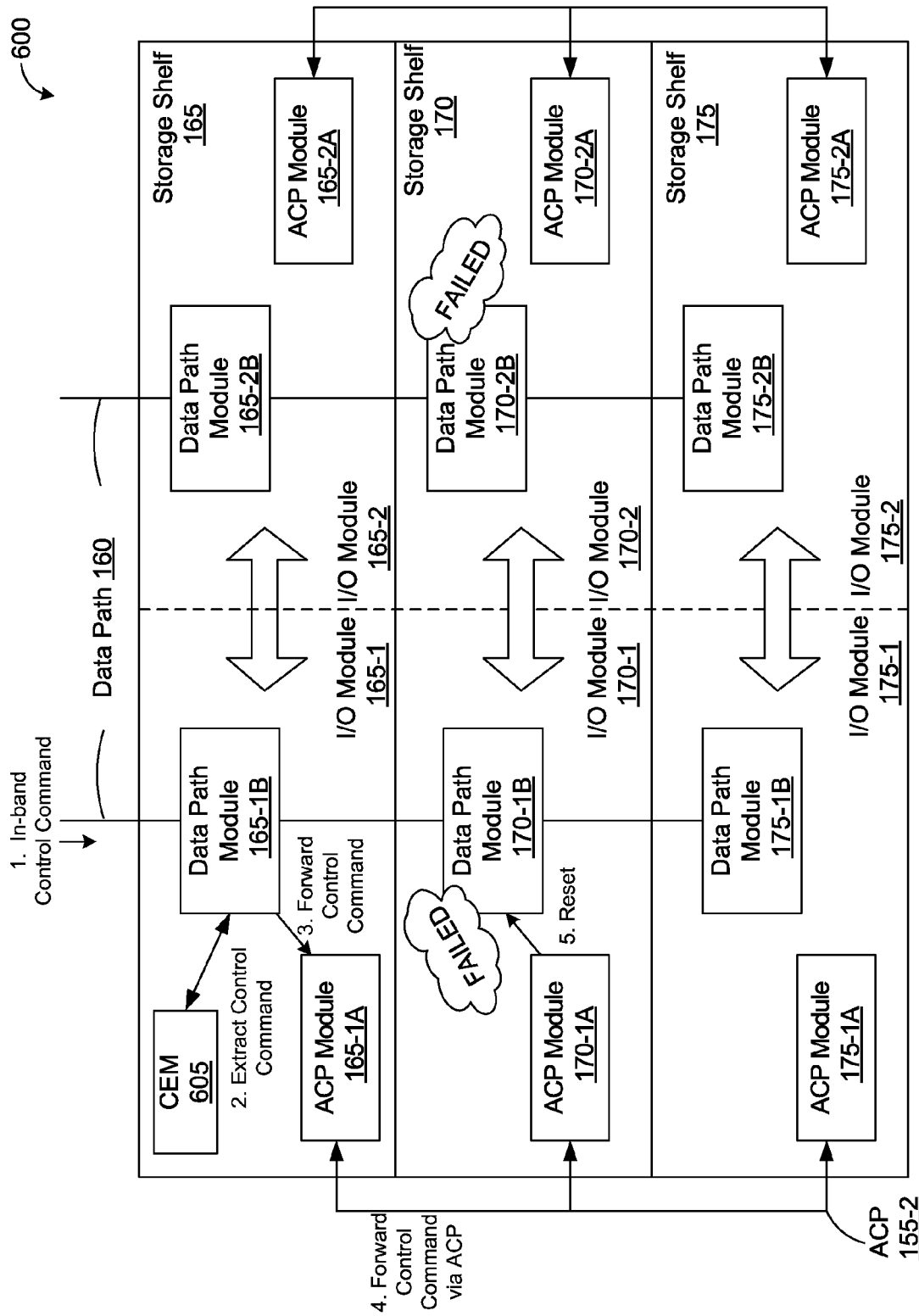
FIG. 6 is a block diagram illustrating a system for controlling I/O modules of the storage subsystem using mixed in-band ACP control mode, consistent with various embodiments of the disclosed technology.

FIG. 6 is a block diagram illustrating a system 600 for controlling I/O modules 170-1 and 170-2 of the storage subsystem 180 using mixed in-band ACP control mode, consistent with various embodiments of the disclosed technology. In the system 600, each of the storage shelves have an I/O module pair. For example, storage shelf 170 has the I/O module pair 170-1 and 170-2. Consider that I/O module pair 170-1 and 170-2 is non-responsive. The storage server 115 can control/recover the I/O module pair 170-1 and 170-2 by sending control commands, e.g., reset command, for the I/O module pair 170-1 and 170-2 via an I/O module of another storage shelf, e.g., I/O module of an storage shelf. Consider that the storage server 115 sends the reset command to I/O module 165-1 of storage shelf 165.

The storage server 115 generates an in-band control command containing a control command and transmits the in-band control command to the I/O module 165-1. The I/O module 165-1 receives the in-band control command at the data path module 165-1B. A command extraction module 605 associated with the data path module 165-1B extracts the control command from the in-band control command. The data path module 165-1B then forwards the control command to the ACP module 165-1A. The ACP module 165-1A forwards the control command to the ACP module 170-1A of the wedged I/O module 170-1 over the ACP 155-2. In some embodiments, the control command is forwarded towards its final destination, e.g., I/O module 170-1, based on a Media Access Control (MAC) and/or Internet protocol (IP) address of the ACP processor of the I/O module 170-1. The control command can contain the MAC address of the ACP processor of the I/O module 170-1.

After receiving the control command, the ACP module 170-1A causes the data path module 170-1B to execute the control command, e.g., to reset the data path module 170-1B. After resetting the data path module 170-1B, the I/O module 170-1 recovers from failure and becomes responsive to the data commands from the storage server 115.

After the I/O module 170-1 has recovered, the other non-responsive I/O module in the storage shelf 170, I/O module 170-2, can be recovered either in mixed in-band ACP control mode, e.g., similar to as described with respect to I/O module 170-1, or in pure in-band ACP control mode, e.g., as described with reference to FIGS. 3 and 4.

Figure 7:
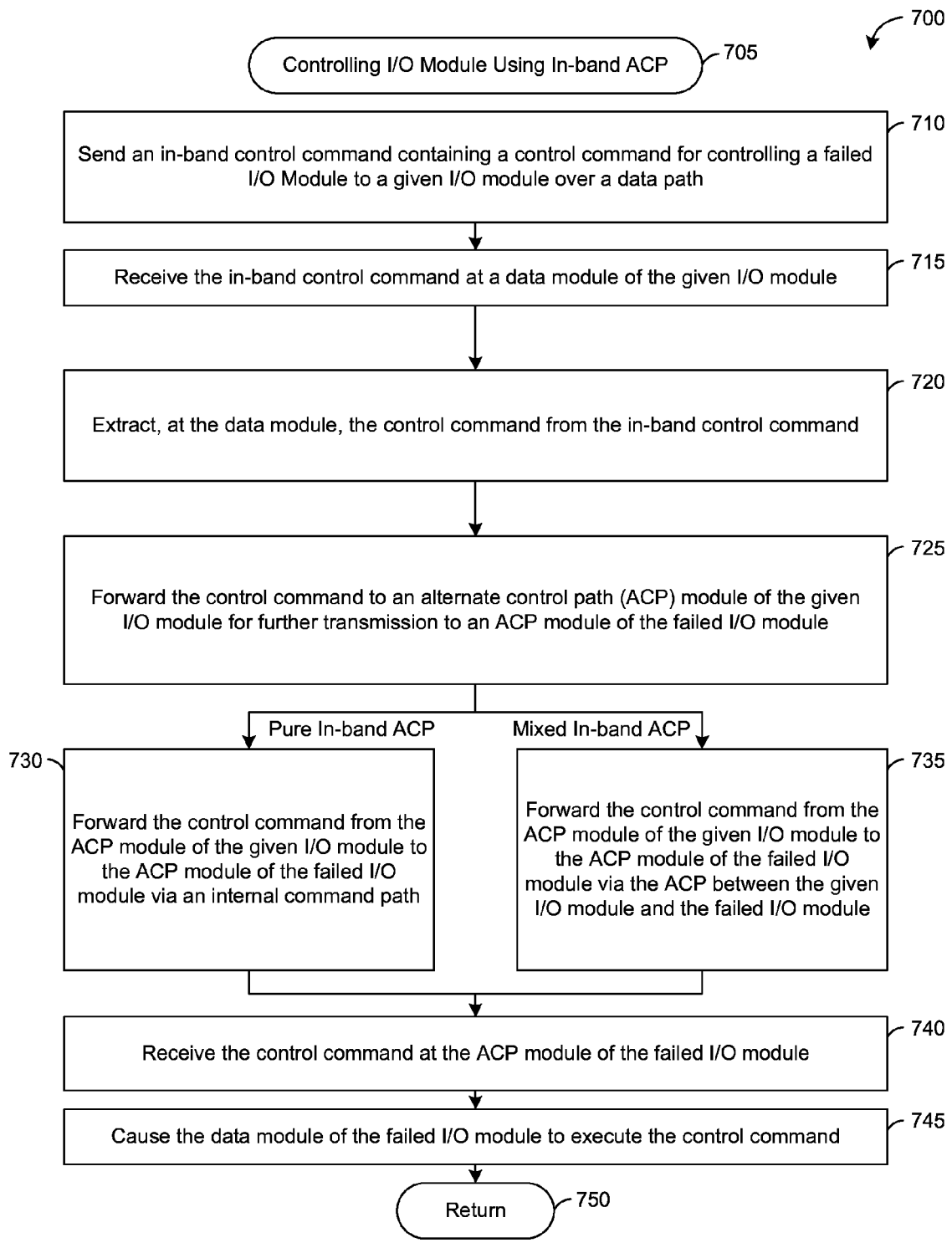
FIG. 7 is a flow diagram of a process for controlling or recovering I/O modules in a storage system using in-band ACP control mode, consistent with various embodiments of the disclosed technology.

FIG. 7 is a flow diagram of a process 700 for controlling or recovering I/O modules in a storage system using in-band ACP, consistent with various embodiments of the disclosed technology. The process 700 may be executed in a system such as system 400 of FIG. 4 or system 600 of FIG. 6. The process 700 beings at block 705, and at block 710, the storage server 115 sends an in-band control command containing a control command for controlling a failed I/O module to a given I/O module over a data command path, e.g., data path 160. The I/O module can fail for various reasons, e.g., data path module associated with I/O module is wedged.

The control command can include a command, e.g., a reset, a reboot, or a power cycle command, that recovers the failed I/O module. The control command be of various protocols, including ACP protocol. To transmit the control command over the data path 160, the storage server 115 converts the control command to a protocol that is compatible with the data path 160, e.g., SAS protocol. For example, the storage server 115 encapsulates the ACP control command into the SAS protocol and generates the in-band control command.

In some embodiments, the control command includes an address of the I/O module 170-2, e.g., MAC/IP address of the ACP processor of the I/O module, to which the control command is intended. The control command is forwarded towards its final destination based on the MAC and/or IP address of the ACP processor of the failed I/O module.

At block 715, the given I/O module 170-1 receives the in-band control command at a data path module of the given I/O module. In some embodiments, a data processor in the data path module receives the in-band control command.

At block 720, a control command extraction unit associated with the data path module of the given I/O module extracts the control command from the in-band control command. In some embodiments, extracting the command includes converting the in-band control command from the protocol that is used to transmit along the data path 160 to the protocol of the control command. For example, converting the SAS in-band control command to the ACP control command.

At block 725, the data path module of the given I/O module forwards the control command to the ACP module of the given I/O module for further transmission to the ACP processor of the failed I/O module. The given I/O module can forward the control command to the failed I/O module in various ways based on the control mode. For example, block 730 describes forwarding the control command in pure in-band ACP control mode and block 735 describes forwarding the control command in mixed in-band ACP control mode.

At block 730, the ACP module of the given I/O module forward the control command from the ACP processor of the given I/O module to the ACP processor of the failed I/O module via an internal command path, e.g., VLAN. In the pure in-band ACP control mode, since there is no ACP between the storage server and the failed I/O module, the storage server 115 sends the control command to the given I/O module which then forwards the control command over the internal command path to the failed I/O module.

In mixed in-band ACP control mode, since there is an ACP between the given I/O module and the failed I/O module, the ACP processor of the given I/O module forwards the control command to the ACP processor of the failed I/O module via the ACP between the given I/O module and the failed I/O module (block 735).

Further, regardless of a number of I/O modules which the control command has to pass through to get to the final destination, e.g., the failed I/O module, the control command is forwarded to the failed I/O module based on the MAC/IP address of the failed I/O module included in the control command.

At block 740, the ACP module of the failed I/O module receives the control command forwarded by the ACP module of the given I/O module.

At block 745, the ACP module of the failed I/O module causes the control command to be executed at the data path module of the failed I/O. For example, the ACP module causes the data path module to reset and therefore, recover from failure.

Figure 8:
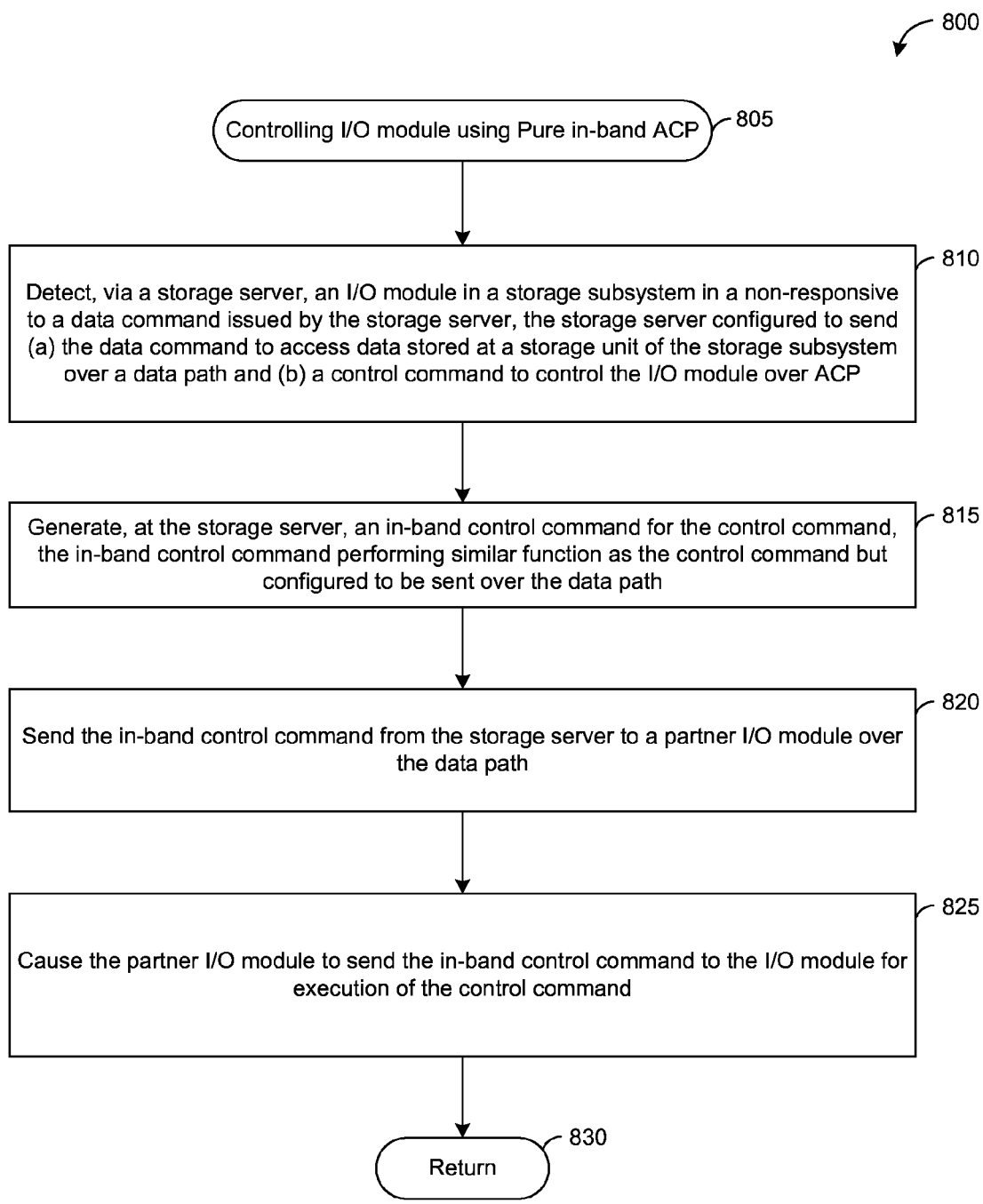
FIG. 8 is a flow diagram of a process for a storage server to recover a non-responsive I/O module of a storage subsystem using pure in-band ACP control mode, consistent with various embodiments of the disclosed technology.

FIG. 8 is a flow diagram of a process 800 for a storage server to recover a non-responsive I/O module of a storage subsystem using pure in-band control mode, consistent with various embodiments of the disclosed technology. In some embodiments, the process 800 may be implemented in a system such as system 400 of FIG. 4. The process 800 begins at block 805, and at block 810, the storage server 115 detects an I/O module, e.g., I/O module 170-2, in a storage subsystem 180 is non-responsive to a data command issued by the storage server. The I/O module 170-2 can be non-responsive for various reasons, e.g., data path module 170-2B is wedged.

In some embodiments, the storage server 115 can detect that the I/O module 170-2 is non-responsive in various other ways, e.g., the ACP module 170-2A, which monitors the data path module 170-2B based on the heartbeat messages transmitted from the data module 170-2B, can inform the storage server 115 that the I/O module 170-2 is not responsive if the ACP module 170-2A does not receive the heartbeat message for configured period of time.

The storage server 115 typically uses a data path between the storage server 115 and the I/O modules in the storage subsystem 180, e.g., data path 160, to send data commands. The data commands are typically for writing/accessing data stored at a storage unit of the storage subsystem 180. The storage server 115 typically uses an ACP to send a control command for controlling a non-responsive I/O module. The ACP can be either between the storage server 115 and the I/O modules in the storage subsystem 180 or between the I/O modules in the storage subsystem 180. However, in the process 800 for pure in-band ACP control mode, there is no ACP either between the storage server 115 and the I/O modules in the storage subsystem 180 or between the I/O modules in the storage subsystem 180.

At block 815, the storage server 115 generates an in-band control command containing a control command, e.g., reset command, to recover the I/O module 170-2. In some embodiments, the in-band control command performs similar function as the control command but is configured to be sent over the data path 160 instead of the ACP. In some embodiments, the in-band control command is generated as explained at least with reference to FIG. 4 and FIG. 7.

At block 820, the storage server 115 sends the in-band control command to a partner I/O module of the I/O module 170-2, e.g., I/O module 170-1, over the data path 160. In some embodiments, the control command includes an address of the I/O module 170-1, e.g., MAC/IP address of the ACP processor of the I/O module, to which the control command is intended. The control command is forwarded towards its final destination based on the MAC and/or IP address of the ACP processor of the failed I/O module.

At block 825, the storage server 115 causes the partner I/O module 170-1 to send the in-band control command to the I/O module 170-2 for execution of the control command, and the process returns at block 830. In some embodiments, the partner I/O module 170-1 extracts the control command from the in-band control command and then forwards the control command to the ACP module 170-2A of the I/O module 170-2 for execution at the data path module 170-2B. In some embodiments, the control command is extracted from the in-band control command as described at least with reference to FIGS. 4 and 7. In some embodiments, the partner I/O module 170-1 sends the control command to the ACP module 170-2A over an internal command path, e.g., internal command path 410, that enables communication between I/O modules of a storage shelf.

Figure 9:
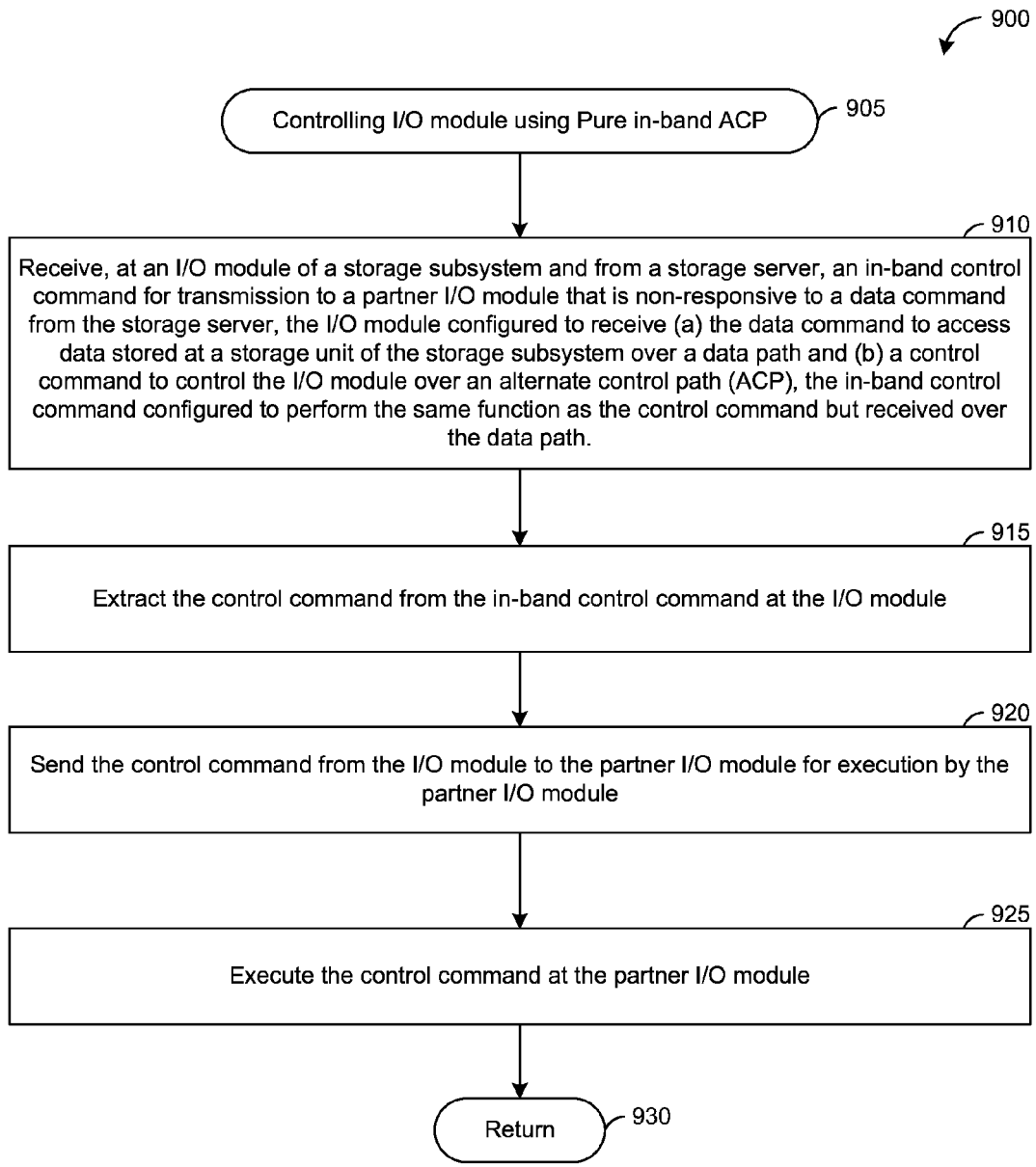
FIG. 9 is a flow diagram of a process for an I/O module in a storage subsystem to recover a non-responsive I/O module in the storage subsystem using pure in-band ACP control mode, consistent with various embodiments of the disclosed technology.

FIG. 9 is a flow diagram of a process 900 for an I/O module in a storage subsystem to recover a non-responsive I/O module in the storage subsystem using pure in-band control mode, consistent with various embodiments of the disclosed technology. In some embodiments, the process 900 may be implemented in a system such as system 400 of FIG. 4. The process 900 helps an I/O module, e.g., I/O module 170-1 to recover a non-responsive or failed partner I/O module 170-2 in a storage subsystem 180. The I/O module 170-2 can be non-responsive for various reasons, e.g., data path module 170-2B is wedged.

The process 900 begins at block 905, and at block 910, the I/O module 170-1, receives an in-band control command containing a control command, e.g., reset command, from a storage server 115 to recover the I/O module 170-2. The in-band control command is received over the data path 160.

In some embodiments, the in-band control command performs similar function as the control command but is configured to be sent over the data path 160 instead of the ACP. In some embodiments, the in-band control command is generated as explained at least with reference to FIG. 4 and FIG. 7.

The storage server 115 typically uses a data path between the storage server 115 and the I/O modules in the storage subsystem 180, e.g., data path 160, to send data commands to the I/O modules in the storage subsystem 180. The data commands are typically for writing/accessing data stored at a storage unit of the storage subsystem 180. The storage server 115 typically uses an ACP to send a control command for controlling a non-responsive I/O module. The ACP can be either between the storage server 115 and the I/O modules in the storage subsystem 180 or between the I/O modules in the storage subsystem 180. However, in the process 900 for recovering an I/O module in pure in-band ACP control mode, there is no ACP either between the storage server 115 and the I/O modules in the storage subsystem 180 or between the I/O modules in the storage subsystem 180.

At block 915, the I/O module 170-1 extracts the control command from the in-band control command. In some embodiments, the control command is extracted from the in-band control command as described at least with reference to FIGS. 4 and 7.

At block 920, the I/O module 170-1 sends control command to the failed partner I/O module 170-2 for execution by the partner I/O module 170-2. In some embodiments, the I/O module 170-1 sends the control command to the ACP module 170-2A of the I/O module 170-2 for execution at the data path module 170-2B. The I/O module 170-1 sends the control command to the ACP module 170-2A over an internal command path, e.g., internal command path 410, that enables communication between I/O modules of a storage shelf.

At block 925, the failed I/O module 170-2 executes the control command and recovers from failure, and the process returns at block 930. In some embodiments, executing the control command includes the ACP module 170-2A causing the data path module 170-2B to execute the control command, e.g., resetting itself.

Figure 10:
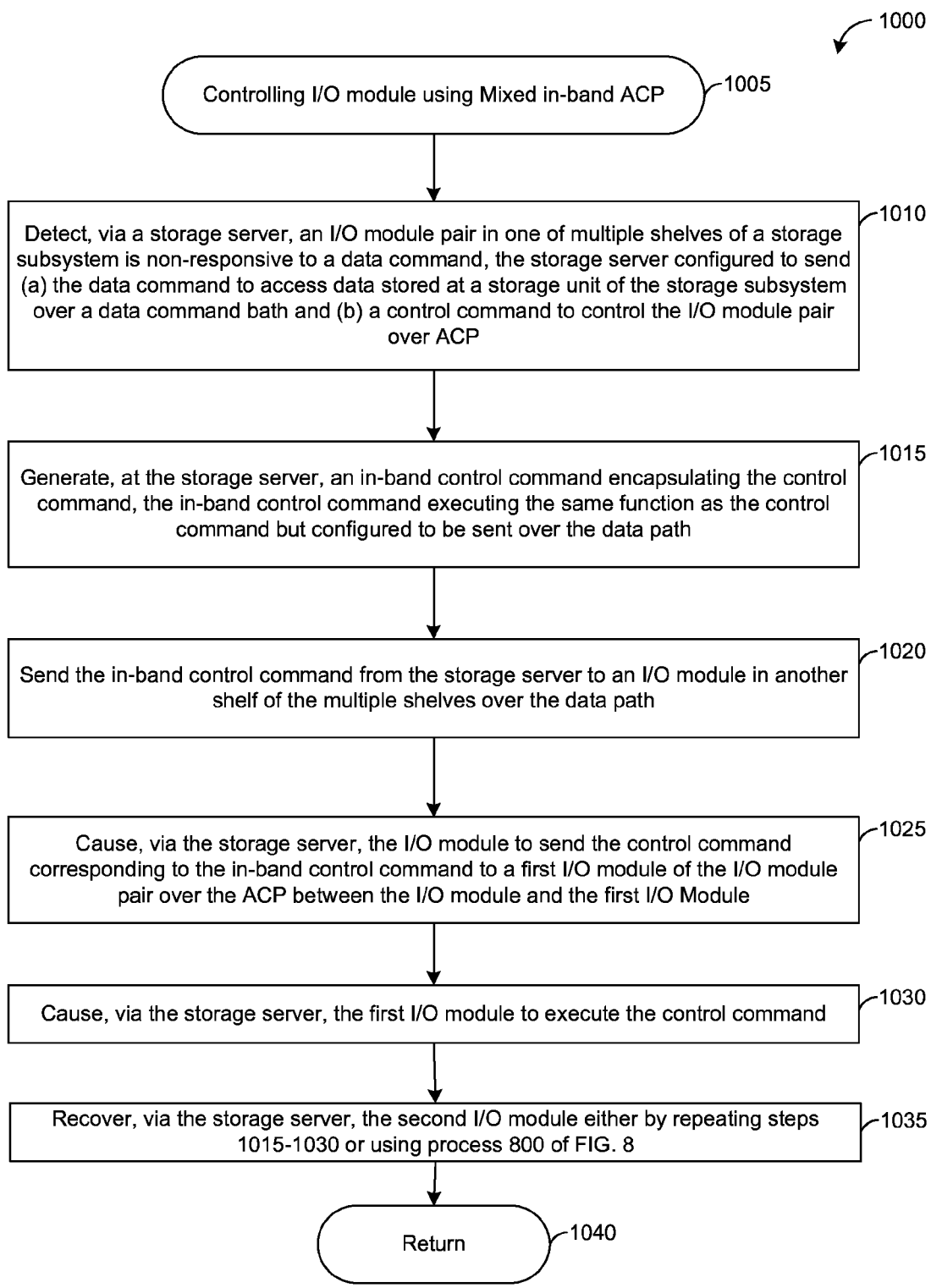
FIG. 10 is a flow diagram of a process for recovering non-responsive I/O modules in a storage shelf of a storage subsystem using mixed in-band ACP control mode, consistent with various embodiments of the disclosed technology.

FIG. 10 is a flow diagram of a process 1000 for recovering non-responsive I/O modules in a storage shelf of a storage subsystem using mixed in-band control mode, consistent with various embodiments of the disclosed technology. In some embodiments, the process 1000 may be implemented in a system such as system 600 of FIG. 6. The process 1000 helps in recovering non-responsive I/O modules when all I/O modules in a storage shelf, e.g., I/O module pair 170-1 and 170-2 in the storage shelf 170, of a storage subsystem 180 have failed. The I/O module pair 170-1 and 170-2 can be non-responsive for various reasons, e.g., data path module of the corresponding I/O module pair 170-1 and 170-2 are wedged.

The process 1000 begins at block 1005, and at block 1010, the storage server 115 detects the I/O module pair 170-1 and 170-2 is non-responsive to a data command issued by the storage server 115. The storage server 115 typically uses a data path between the storage server 115 and the I/O modules in the storage subsystem 180, e.g., data path 160, to send data commands. The data commands are typically for writing/accessing data stored at a storage unit of the storage subsystem 180. In general, the storage server 115 uses an ACP to send a control command for controlling a non-responsive I/O module. The ACP can be either between the storage server 115 and the I/O modules in the storage subsystem 180 or between the I/O modules in the storage subsystem 180. However, in the process 1000 for mixed in-band ACP control mode, while the I/O modules in the storage subsystem 180 are connected to each other with ACP, there is no ACP between the storage server 115 and the I/O modules in the storage subsystem 180.

At block 1015, the storage server 115 generates an in-band control command containing a control command, e.g., reset command, to recover the I/O module 170-2. In some embodiments, the in-band control command performs similar function as the control command but is configured to be sent over the data path 160 instead of the ACP. In some embodiments, the in-band control command is generated as explained at least with reference to FIG. 4 and FIG. 7.

At block 1020, the storage server 115 sends the in-band control command to an I/O module in another shelf of the multiple shelves of the storage subsystem 180. For example, the storage server 115 sends the control command to an I/O module 165-1 in storage shelf 165 that is adjacent to the storage shelf having the non-responsive I/O module pair. The storage server 115 sends the control command to the I/O module 165-1 over the data path 160.

At block 1025, the storage server 115 causes the I/O module 165-1 to send the control command to one of the non-responsive I/O module pair 170-1 and 170-2, e.g., I/O module 170-1, for execution of the control command. In some embodiments, the I/O module 165-1 extracts the control command from the in-band control command and then forwards the control command to the I/O module 170-1 for execution. In some embodiments, the control command is extracted from the in-band control command as described at least with reference to FIGS. 4 and 7.

Referring back to block 1025, the I/O module 165-1 sends the control command to the non-responsive I/O module 170-1 over the ACP, e.g., ACP 155-2, that connects each of the I/O modules to other I/O modules within the storage subsystem 180. In some embodiments, the control command includes an address of the I/O module 170-1, e.g., MAC/IP address of the ACP processor of the I/O module, to which the control command is intended. The control command is forwarded towards its final destination based on the MAC and/or IP address of the ACP processor of the failed I/O module.

At block 1030, the I/O module 170-1 executes the control command, e.g., resets data path module 170-1B. After resetting the data path module 170-1B, the I/O module 170-1 recovers from failure.

After the I/O module 170-1 has recovered, at block 1035, the other non-responsive I/O module in the storage shelf 170, e.g., I/O module 170-2, is recovered similarly by executing at least blocks 1015-1030 for the I/O module 170-2 and the process returns at block 1040. In some embodiments, the I/O module 170-2 can also be recovered using pure in-band ACP control mode recovery process 800 and 900 as described at least with reference to FIGS. 8 and 9, respectively.

Figure 11:
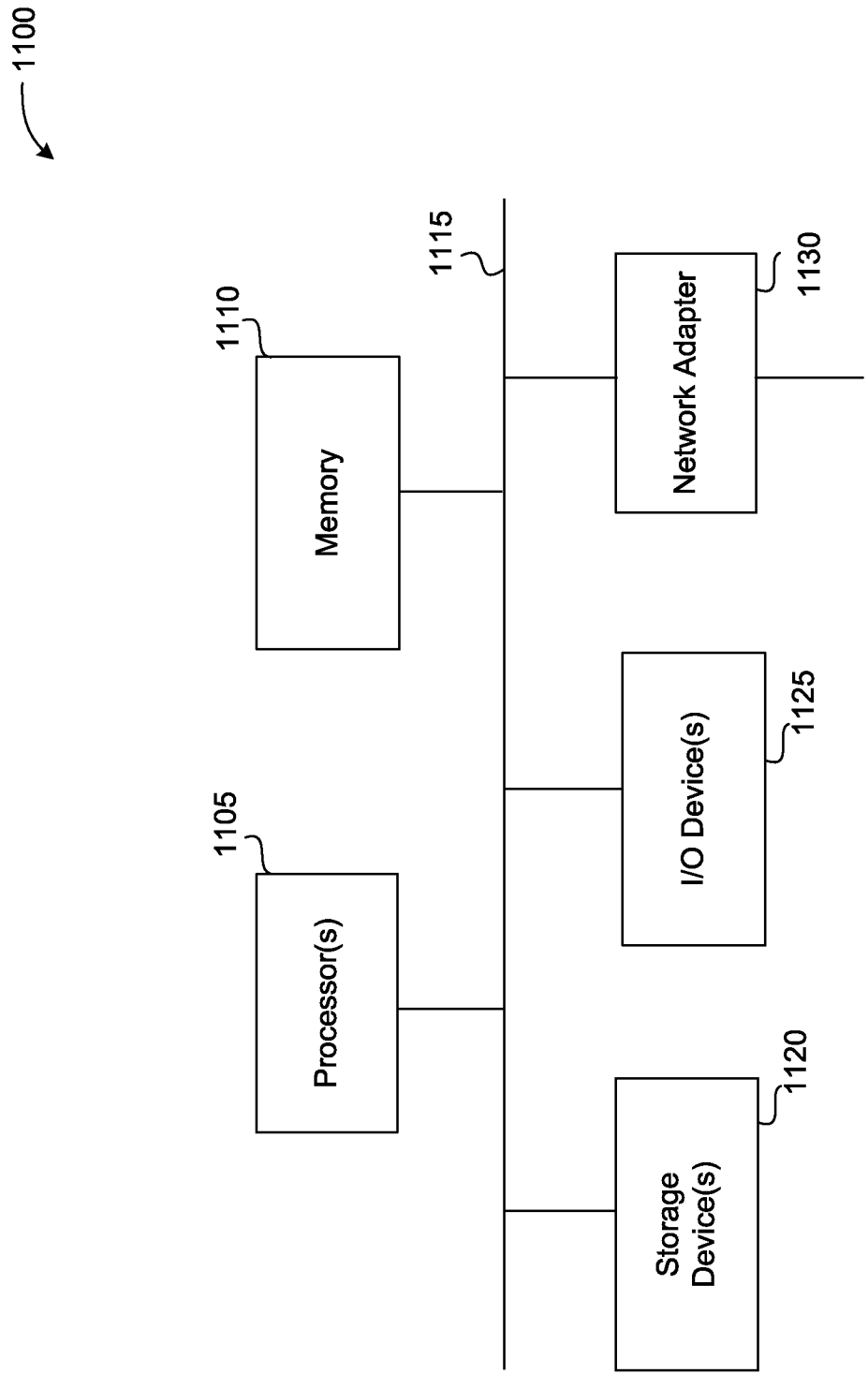
FIG. 11 is a block diagram of a computer system as may be used to implement features of some embodiments of the disclosed technology.

FIG. 11 is a block diagram of a computer system as may be used to implement features of some embodiments of the disclosed technology. The computing system 1100 may be used to implement any of the entities, components or services depicted in the examples of FIGS. 1-10 (and any other components described in this specification). The computing system 1100 may include one or more central processing units ("processors") 1105, memory 1110, input/output devices 1125 (e.g., keyboard and pointing devices, display devices), storage devices 1120 (e.g., disk drives), and network adapters 1130 (e.g., network interfaces) that are connected to an interconnect 1115. The interconnect 1115 is illustrated as an abstraction that represents any one or more separate physical buses, point to point connections, or both connected by appropriate bridges, adapters, or controllers. The interconnect 1115, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1110 and storage devices 1120 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 1110 can be implemented as software and/or firmware to program the processor(s) 1105 to carry out actions described above. In some embodiments, such software or firmware may be initially provided to the processing system 1100 by downloading it from a remote system through the computing system 1100 (e.g., via network adapter 1130).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method, comprising:
    detecting, by a storage server, an I/O module in a storage subsystem is non-responsive to a data command issued by the storage server, the storage server configured to send
        the data command to access data stored at a storage unit of the storage subsystem over a data path, and
        a control command to control the I/O module over an alternate control path (ACP);
    generating, by the storage server, an in-band control command for the control command, the in-band control command performing functions of the control command but configured to be sent over the data path;
    sending, by the storage server, the in-band control command to a partner I/O module over the data path; and
    causing, by the storage server, the partner I/O module to send the in-band control command to the I/O module for execution of the control command.

2. The method of claim 1, wherein the control command is at least one of a command that resets the I/O module or a command that power cycles, powers on/off the I/O module.

3. The method of claim 1 wherein, the data command is of a first protocol and the control command is of a second protocol.

4. The method of claim 3, wherein generating the in-band control command includes:
    encapsulating, by the storage server, the control command into the first protocol to generate the in-band control command.

5. The method of claim 4, wherein causing the partner I/O module to send the in-band control command to the I/O module further includes:
    extracting, by a data module of the partner I/O module, the control command from the in-band control command, forwarding, by the data module, the control command to an ACP module of the partner I/O module, and sending, by the ACP module and via an internal communication path between the partner I/O module and the I/O module, the control command to a second ACP module of the I/O module.

6. The method of claim 5 further comprising:

causing, by the storage server, the second ACP module to execute the control command on a second data module of the I/O module.

7. The method of claim 5, wherein extracting the control command from the in-band control command includes converting the in-band control command to the second protocol to obtain the control command.

8. The method of claim 4, wherein the first protocol is a Serial Attached SCSI (SAS) protocol and the second protocol is an ACP protocol.

9. The method of claim 8, wherein the data path is created by coupling the I/O module to a storage adapter of the storage server using SAS cables.

10. The method of claim 8, wherein the ACP is created by coupling the I/O module to a network adapter of the storage server using Ethernet cables.

11. The method of claim 10, wherein sending the in-band control command over the data communication path includes making the ACP redundant, thereby eliminating the need to use Ethernet cables.

12. The method of claim 1, wherein the partner I/O module is in the same storage shelf of the storage subsystem as the I/O module.

13. A method comprising:

receiving, at an I/O module of a storage subsystem and from a storage server, an in-band control command for transmission to a partner I/O module that is non-responsive to a data command from the storage server, the I/O module configured to receive the data command to access data stored at a storage unit of the storage subsystem over a data path, and a control command to control the I/O module over an alternate control path (ACP), the in-band control command configured to perform the same function as the control command but received over the data path;

extracting, by the I/O module, the control command from the in-band control command; and sending, by the I/O module, the control command to the partner I/O module for execution by the partner I/O module.

14. The method of claim 13 further comprising:

executing the control command by the partner I/O module.

15. The method of claim 13, wherein the data command is of a first protocol and the control command is of a second protocol.

16. The method of claim 15, wherein receiving the in-band control command from the storage server includes:

encapsulating, by the storage server, the control command into the first protocol to generate the in-band control command, and sending, by the storage server, the in-band control command to the I/O module over the data communication path.

17. The method of claim 15, wherein extracting the control command from the in-band control command includes converting the in-band control command to the second protocol to obtain the control command.

18. A method comprising:

detecting, by a storage server, an I/O module pair in one of multiple shelves of a storage subsystem is non-responsive to a data command issued by the storage server, the storage server configured to send the data command to access data stored at a storage unit of the storage subsystem over a data path, and a control command to control the I/O module pair over an alternate control path (ACP);

generating, by the storage server, an in-band control command for the control command, the in-band control command executing the same function as the control command but configured to be sent over the data path;

sending, by the storage server, the in-band control command to an I/O module in another shelf of the multiple shelves over the data path; and causing, by the storage server, the I/O module to send the control command corresponding to the in-band control command for execution to a first I/O module of the I/O module pair over the ACP between the I/O module and the first I/O module.

19. The method of claim 18, wherein causing the I/O module to send the control command corresponding to the in-band control command to a first I/O includes causing the I/O module to extract the control command from the in-band control command received from the storage server.

20. The method of claim 18 further comprising:

causing, by the storage server, the first I/O module to execute the control command.

21. The method of claim 20 further comprising:

sending, by the storage server, a second in-band control command to the first I/O module over the data communication path for further transmission to a second I/O module of the I/O module pair; and causing, by the storage server, the first I/O module to send a second control command corresponding to the second in-band control command to the second I/O module over an internal communication path between the I/O module pair.

22. The method of claim 18, wherein the data command is of a serial attached SCSI (SAS) protocol and the control command is of an ACP protocol.

23. The method of claim 22, wherein the data path is created by coupling I/O modules in the multiple shelves to a storage adapter of the storage server using SAS cables.

24. The method of claim 22, wherein the ACP is created by coupling an I/O module pair in each of the shelves with another I/O module pair of the next shelf using Ethernet cables, and wherein there is no ACP between the storage server and the storage subsystem.

25. A networked storage system, comprising:

a storage subsystem having an I/O module, the I/O module including an alternate control path (ACP) module to cause execution of a control command for controlling the I/O module, and a data module to receive an in-band control command containing the control command for controlling a partner I/O module of the I/O module, the in-band control command received over a data communication path; and a storage server, coupled to the storage subsystem, to detect the partner I/O module is non-responsive to a data command for accessing data stored at a storage unit of the storage subsystem, and send an in-band control command for controlling the partner I/O module to the I/O module, the in-band control command being an encapsulated command containing the control command for controlling the partner I/O module, the in-band control command transmitted over the data path connecting the storage server and the data module of the I/O module.

26. The networked storage system of claim 25, wherein the data module of the I/O module is further configured to extract the control command from the in-band control command and forward the control command to the ACP module of the I/O module.

27. The networked storage system of claim 26, wherein the ACP module is further configured to forward the control command to a second ACP module of the partner I/O module via an internal command path.

28. The networked storage system of claim 27, wherein the second ACP module of the partner I/O module causes the control command to be executed on a second data module of the partner I/O module.

29. An apparatus comprising:
a data module in a I/O module of a storage subsystem to receive a control command for controlling a partner I/O module of the I/O module, the control command received over a first connection means connecting the data module with a sender of the control command, the control command received over the first connection means if a second connection means connecting the partner I/O module and the sender that is configured to receive the control command is absent, the data module receiving the control command as an in-band control command, the in-band control command encapsulating the control command using a protocol that is used communicate with the data module;
a command extraction module to extract the control command from the in-band control command; and
an alternate control path (ACP) module in the I/O module to
cause execution of the control command by the data module for controlling the I/O module or
forward the control command to a second ACP module of the partner I/O module for causing execution of the control command by a second data module of the partner I/O module.

30. The apparatus of claim 29, wherein the first connection means includes SAS cables and the second connection means includes Ethernet cables.

* * * * *